(12) United States Patent
Leblanc

(10) Patent No.: US 6,724,469 B2
(45) Date of Patent: Apr. 20, 2004

(54) POLARIZATION-OTDR FOR MEASURING CHARACTERISTICS OF OPTICAL FIBERS

(75) Inventor: Michel Leblanc, Quebec (CA)

(73) Assignee: Exfo Electro-Optical Engineering Inc., Vanier (CA)

( * ) Notice: Subject to any disclaimer, the term of this patent is extended or adjusted under 35 U.S.C. 154(b) by 0 days.

(21) Appl. No.: 10/387,803

(22) Filed: Mar. 14, 2003

(65) Prior Publication Data

US 2003/0174312 A1 Sep. 18, 2003

Related U.S. Application Data

(60) Provisional application No. 60/364,130, filed on Mar. 15, 2002.

(51) Int. Cl.$^7$ ............................................. G01N 21/00
(52) U.S. Cl. ..................................................... 356/73.1
(58) Field of Search ................. 356/73.1; 359/181–188, 359/122–133, 156–161, 173, 184; 385/11, 24, 27, 123; 398/9–38, 140–172

(56) References Cited

U.S. PATENT DOCUMENTS

| | | | |
|---|---|---|---|
| 5,384,635 | A | 1/1995 | Cohen et al. |
| 6,229,599 | B1 | 5/2001 | Galtarossa |
| 6,459,518 | B1 * | 10/2002 | Suzuki et al. ............... 398/152 |
| 6,519,027 | B1 * | 2/2003 | Gordon et al. ............. 356/73.1 |
| 6,567,167 | B1 * | 5/2003 | Chou et al. ................. 356/367 |
| 6,603,890 | B2 * | 8/2003 | Khosravani et al. .......... 385/11 |

OTHER PUBLICATIONS

A.J. Rogers, "Polarization–optical Time Domain Reflectometry: A Technique for the Measurement of Field Distributions", Appl. Opt., 1981, 1060–1074, vol. 20.

F. Corsi. et al., "Beat Length Characteristics Based on Backscattering Analysis in Randomly Perturbed Single–mode Fibers", J. Lightwave Tech.

H. Sunnerud, et al., "Measurement of Polarization Mode Dispersion Accumulation Along Installed Optical Fibers", IEEE Photonic Tech. Letters.

M. Wuilpart, et al., "Fully–distributed Polarization Properties of an Optical Fibre Using the Backscattering Technique", Applications of Photonic Tech.

B. Huttner, et al., "Distributed PMD Measurement With a Polaization–OTDR in Optical Fibers", J. Lightwave Tech., 1999, 1843–1848, vol. 17, No. 10.

M. Leblanc, "Distributed Detection of High–PMD Sections on Installed Fibers Using a Polarization–OTDR", OFMC '01, 155–62, 2001.

* cited by examiner

Primary Examiner—Tu T. Nguyen
(74) Attorney, Agent, or Firm—Thomas Adams

(57) ABSTRACT

In a method of polarization optical time-domain reflectometer (P-OTDR) for measuring a parameter of an optical transmission path, for example an optical fiber, by transmitting pulses of light into the path and measuring the state of polarization of backscattered light against distance, statistical analysis of the degree of polarization (DOP) of the backscattered signal is used to detect sections of an optical transmission path for which mode-coupling behaviour (long h) leads to high PMD. Preferably, successive DOP measurement are taken with different state of polarization, SOP, for the P-OTDR light source.

18 Claims, 7 Drawing Sheets

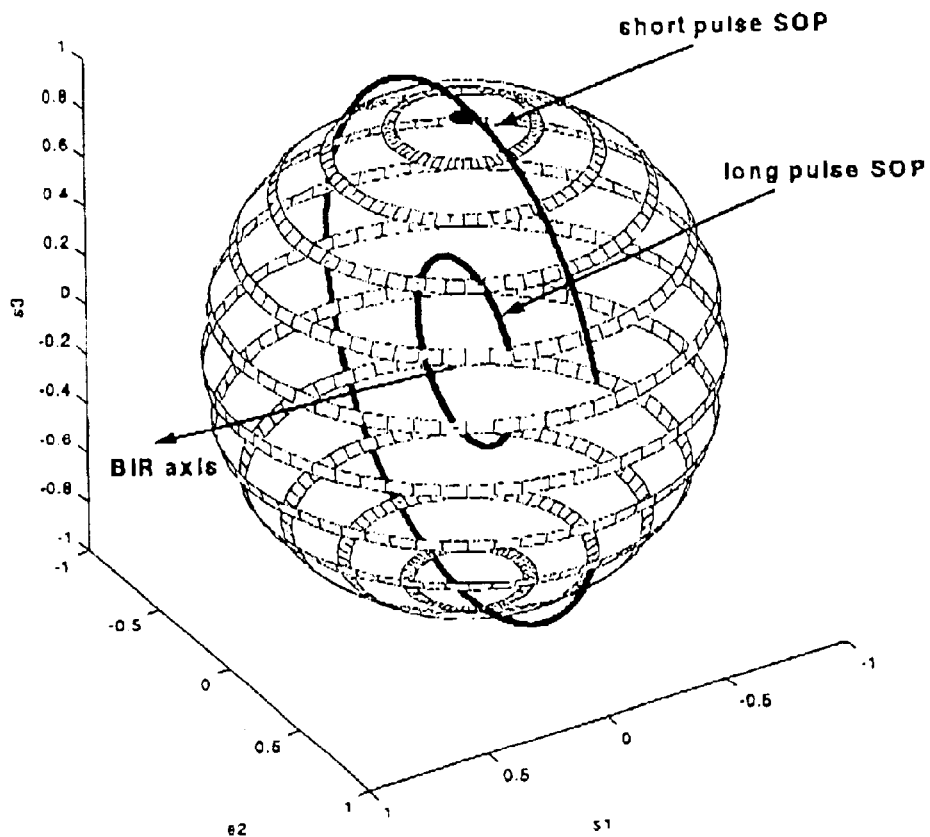
Fig. 1A Calculated backscattered SOP for a short pulse (backward SOP) and a long pulse (measured SOP) against distance for a large angle between the SOP and the birefringence axis.

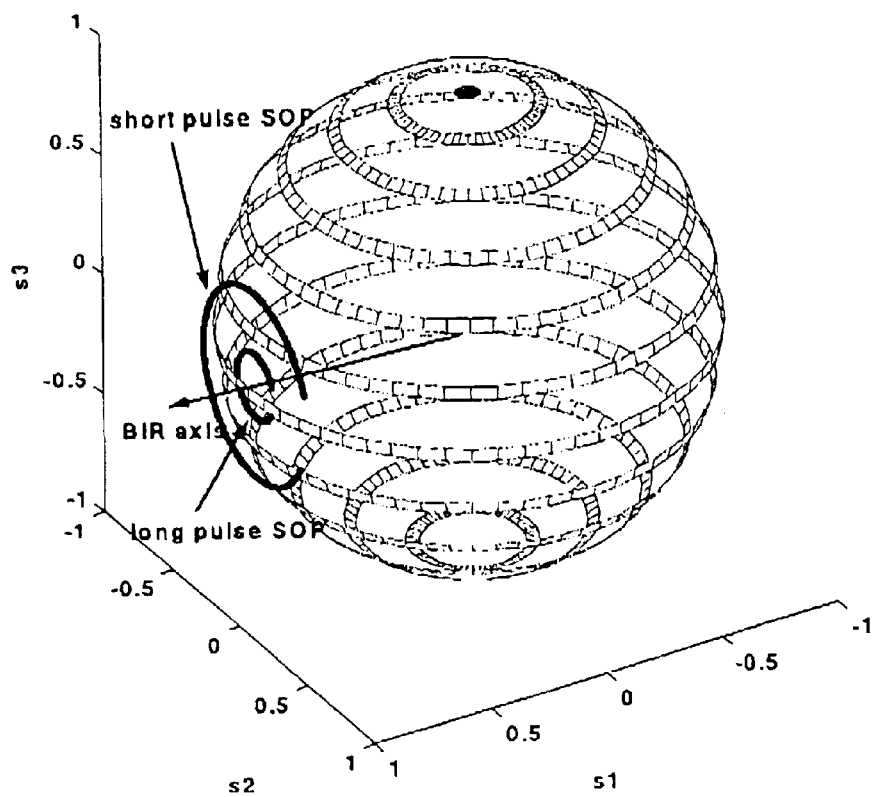
Fig. 1B Calculated backscattered SOP for a short pulse (backward SOP) and a long pulse (measured SOP) against distance for a small angle between the SOP and the birefringence axis.

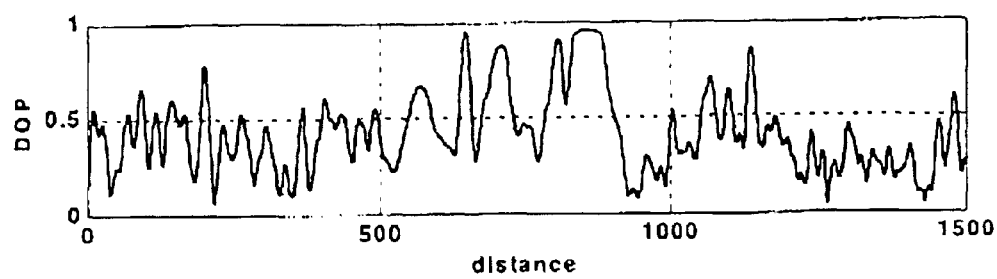
Figure 2: Measured DOP for an optical fiber that exhibits large value of coupling length *h* within its central section (distance from 500 to 1000 m).

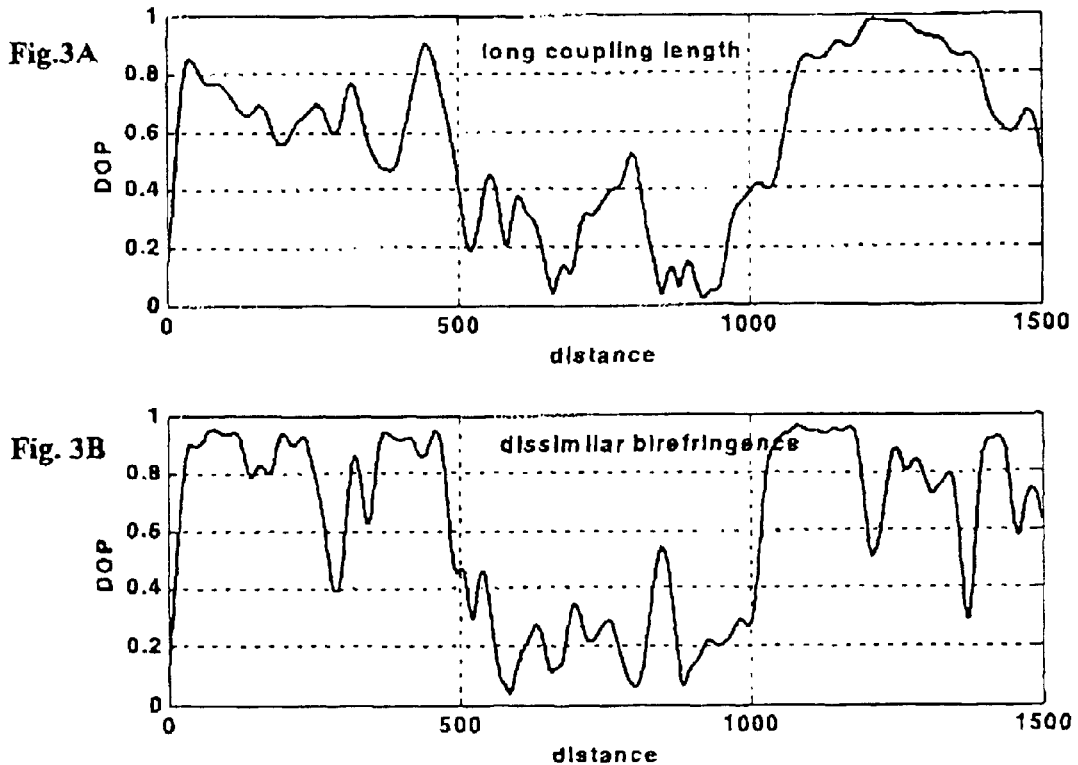
Figure 3A: DOP signature for an optical fiber which exhibits long coupling length $h$ ($h$ close to 500m).
Figure 3B: DOP signature for an optical fiber made of 3 sections of 500m that exhibit dissimilar mean birefringence (0.04 ps/km, 1 ps/km, 0.04 ps/km).

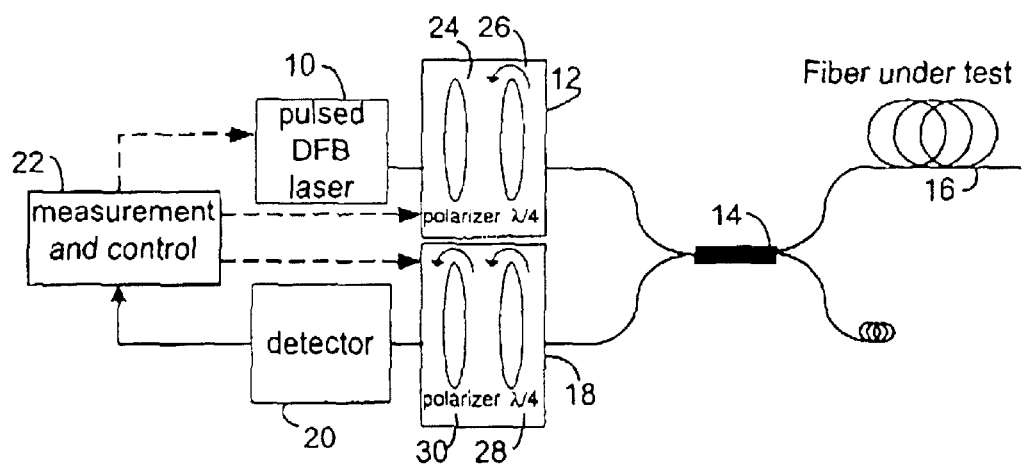
Figure 4 : Simplified block schematic diagram of apparatus for performing P-OTDR measurement on an optical path.

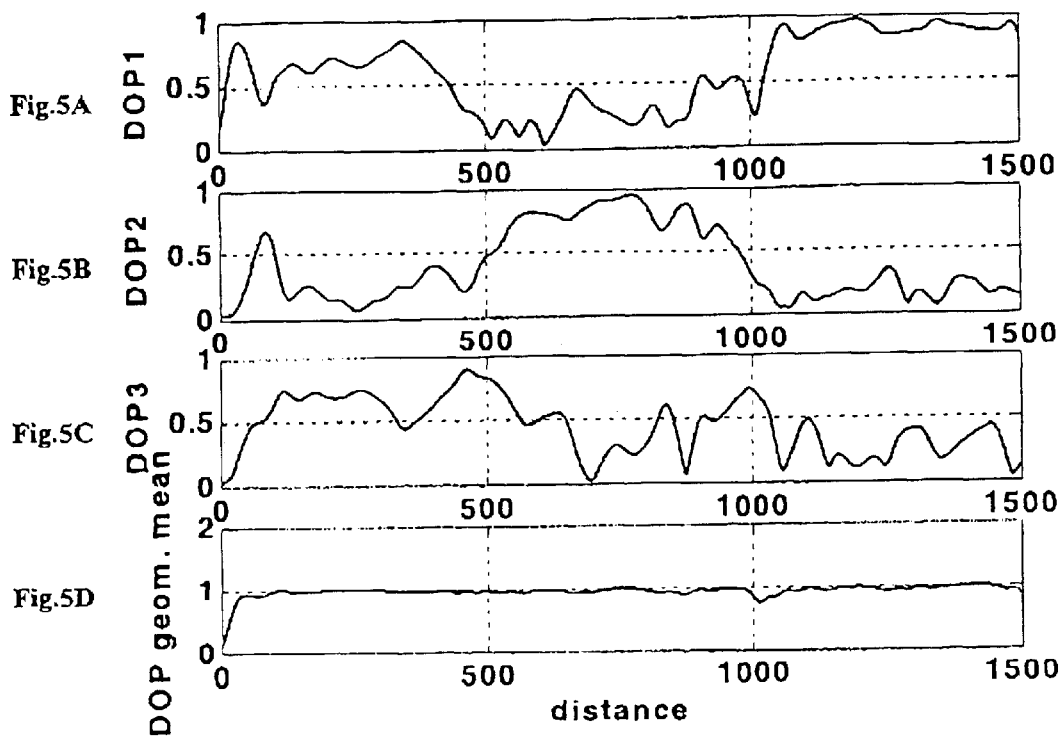
Figure 5A-B-C: DOP signatures against distance for three orthogonal source SOP for a fiber that exhibits large value of coupling length $h$.
Figure 5D: DOP geometric mean against distance for the three DOP shown in Fig. 5A to 5C.

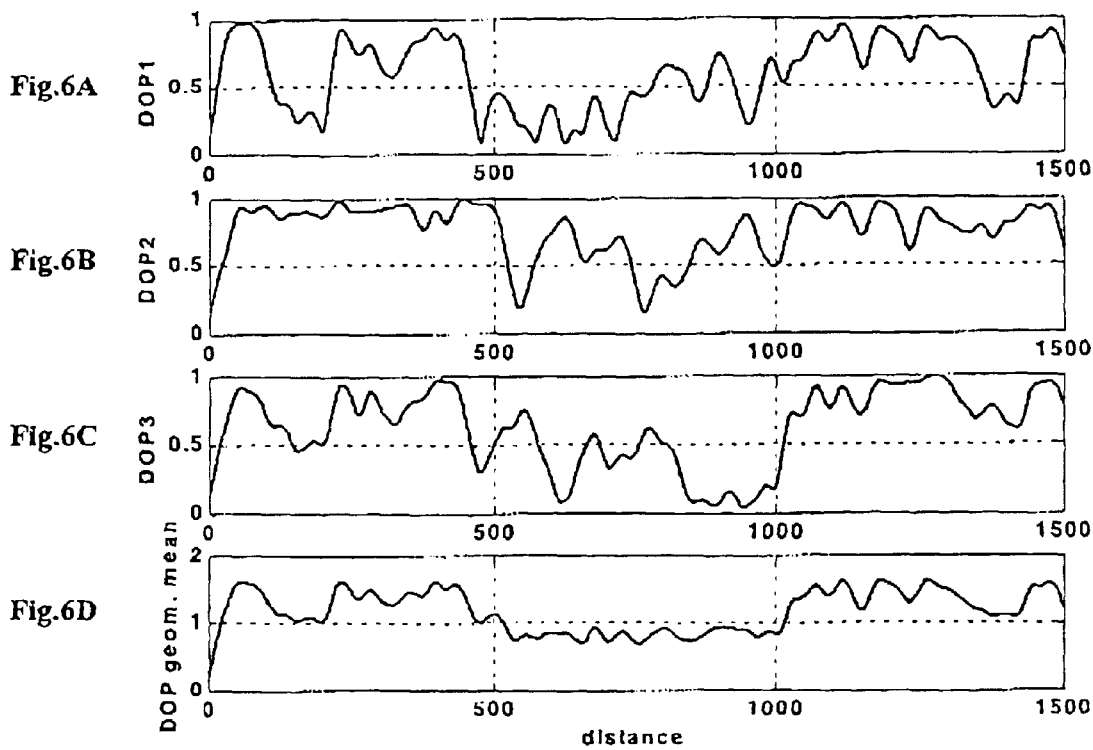
Figure 6A-B-C: DOP signatures against distance for three orthogonal source SOP for a fiber that exhibits dissimilar birefringence.
Figure 6D: DOP geometric mean against distance for the three DOP shown in Fig. 6A to 6C.

POLARIZATION-OTDR FOR MEASURING CHARACTERISTICS OF OPTICAL FIBERS

This application claims priority from U.S. Provisional application No. 60/364,130 filed Mar. 15, 2002.

BACKGROUND OF THE INVENTION

1. Technical Field

The invention relates to the measurement of characteristics of optical paths and is especially, but not exclusively, applicable to the measurement of polarization-dependent characteristics of optical fibers.

2. Background Art

In optical communication systems, newly-installed optical fibers generally have low levels of, for example, polarization mode dispersion (PMD) and can handle current high bit rates. Optical fibers which have been installed for several years, however, may exhibit levels of PMD that are unacceptable for modern optical communication systems. It has been found that, in many cases, the unacceptable overall PMD is caused by a short section of the optical fiber cable. It would be desirable, therefore, to be able to determine which short sections have the worst PMD, and replace those sections only. It has been proposed to use so-called polarization-optical time domain reflectometry (P-OTDR) to locate such sections.

P-OTDR is predicated upon the fact that, although conventional optical time domain reflectometers (OTDRs) measure only the intensity of backscattered light to determine variation of attenuation along the length of a transmission path, the backscattered light also exhibits polarization dependency. P-OTDR utilizes this polarization dependency to monitor polarization dependent characteristics of the transmission path, e.g., an installed optical fiber.

The concept of P-OTDR was introduced in the early 1980s by Rogers [1], who described an OTDR sensitive to the state of polarization (SOP) of the backscattered signal. The simplest P-OTDR comprises an OTDR having a polarizer analyzer in the return path, just prior to its detector. Although initially developed as part of a fiber sensor system for monitoring spatially varying external physical parameters (temperature, strain, etc.), there has recently been heightened interest in variants of this approach to measure the distributed PMD [2–4].

U.S. Pat. No. 5,384,635 (Cohen) discloses a variation based upon synchronous detection to detect cyclic physical perturbations or vibrations of the fiber. More recently, U.S. Pat. No. 6,229,599 (Galtarossa), which is incorporated herein by reference, discloses apparatus for measuring beat length, correlation length and polarization mode dispersion at different positions along the length of the optical fiber. One limitation of Galtarossa's technique is that it derives statistics based upon wavelength and so needs a wavelength tunable source.

Each of these known techniques requires that the P-OTDR have sufficient spatial resolution to "see" the evolution of the SOP as the light propagates down the fiber. This entails the use of short pulses since, when the birefringence of the fiber is large (>1 ps/km), the backscattered beat length is short (<2.5 m) and a short P-OTDR pulse must be used (10 nsec or less). The higher the birefringence of the fiber, the shorter must be the pulse of the P-OTDR. Shorter P-OTDR pulses imply a smaller dynamic range for the instrument. Therefore, high-PMD fibers, that necessarily exhibit high birefringence, are more difficult to characterize than low-PMD fibers.

The PMD of an optical fiber depends upon both the birefringence β and the coupling length h through the following approximation:

$$PMD = \frac{\beta L}{\sqrt{\frac{L}{h}}}$$

where L is the length of the fiber. Generally, the coupling length, h can be defined as the distance required for a significant portion of energy in one mode (fast or slow) to be transferred to another mode. When coupling length h is short, there is a considerable amount of 'scrambling' between the fast and slow axes and the total PMD for the fiber increases proportionally to the square root of the fiber length ($\sqrt{L}$). In contrast, if coupling length h is very long, there is very little coupling between the fast and slow axes and the PMD increases linearly with distance (L).

Fibers that have very little coupling between fast and slow axes (long coupling length h) most likely will exhibit high PMD values, since PMD will accumulate more rapidly with distance. Therefore, the detection of a long coupling length h should allow the identification of most of the high PMD sections in a fiber link.

The distribution of coupling length h along the fiber may be determined by making a fully polarimetric measurement of the SOP as a function of distance. Although this can be achieved via several different P-OTDR implementations, a simple approach is to use a rotatable quarter-wave plate followed by a polarizer prior to the P-OTDR detector. The polarimetric SOP information (the four Stokes parameters S0, S1, S2 and S3) is obtained by taking four different P-OTDR traces, with an appropriate orientation for the quarter-wave plate and the polarizer of the analyzer for each trace. Each trace represents intensity of the backscatter signal against distance for the corresponding one of the settings of the analyzer. The degree of polarization (DOP) contains the critical information one needs in order to estimate coupling length h. The DOP is derived from the Stokes parameters as follows:

$$DOP = \frac{\sqrt{S1^2 + S2^2 + S3^2}}{S0}$$

The degree of polarization of the light launched by the P-OTDR source can be considered as being 100% (DOP=1) to a first approximation, since the light source is a laser. The DOP of the backscattered light from a specific position along the fiber also is equal to 1.0. However, the DOP measured by the P-OTDR will diminish if the SOP of the backscattered signal against distance varies significantly within the P-OTDR resolution, i.e., if $L_b < L_p$ where $L_p$ is the P-OTDR spatial resolution and $L_b$ is the beat length of the backscattered signal. The measured DOP against distance will therefore vary depending on the ratio between $L_b$ and $L_p$. For long P-OTDR pulses ($L_p >> L_b$) a strong depolarization will occur but one can still distinguish between two situations: short and long coupling length, h.

When spatial resolution is much greater than both beat length and coupling length, i.e., $L_p >> L_b$ and $L_p >> h$, the orientations of the fast and slow axes change rapidly within the P-OTDR resolution. This makes the SOP of the backscattered signal along the pulse substantially random and the measured DOP collapses (however the average DOP does not reach zero since partial repolarization occurs on the way back; the DOP therefore tends toward ⅓).

When spatial resolution, i.e, the pulse length, is much greater than beat length, but much less than coupling length, i.e., $L_p \gg L_b$ but $L_p \ll h$, the orientation of the birefringence axis (the fast/slow axis on the Poincare sphere) does not change within the spatial resolution and the SOP of the backscattered signal rotates rapidly around the birefringence axis. Since the P-OTDR resolution is not sufficient to follow the rapid fluctuations of the actual backscattered SOP (i.e, as would be measured using short pulses), the "long pulse" SOP will "collapse" towards the center of the circle traced by the actual, i.e., "short pulse" SOP. FIG. 1A illustrates long and short pulse measurements for the case where there is a large angle between the birefringence axis BIR and the locus of the SOP for a given distance. FIG. 1B illustrates them for the case where the angle is small.

From the "long pulse" or measured SOP, the "long pulse" or measured DOP will be measured and will tend towards the value of the cosine of the angle between the actual SOP (using short pulses) and the birefringence axis BIR. It is therefore expected that the measured DOP (using long pulses) will be anywhere between 0 and 1.0. As long as the orientation of the birefringence axis of the fiber does not change against distance (relative to an initial point), the measured DOP value will not change. If the orientations of the slow and fast axes move, the DOP value will vary. Slow fluctuations with large amplitude of the measured DOP are therefore expected on fibers with a very long coupling length h (an example of this behaviour can be seen in FIG. 2 which shows large, slow variations of DOP for the fiber section between 500 m and 1,000 m, measured by a P-OTDR using 100 ns pulses).

Huttner et al [5] proposed using these slow fluctuations of the DOP to detect the presence of long coupling length h and accordingly high-PMD fiber sections. An interesting characteristic of this technique is that 'long' P-OTDR pulses could be used. The resolution of the P-OTDR has to remain smaller than the coupling length h, but it does not have to be sufficient to discriminate the backscattering SOP fluctuation. This allows a significantly higher useful dynamic range for the P-OTDR apparatus since pulse width in the order of 100 ns to 1000 ns can be used.

Unfortunately, an important limitation of this technique arises when testing a concatenation of short fibers having very dissimilar birefringence values. If some sections have a small birefringence, such that beat length is comparable to the P-OTDR resolution, and other sections have a longer beat length, the DOP signature will exhibit slow and large fluctuations, as illustrated in FIG. 3B which shows the DOP signature of a link of 1.5 km made of 3 sections each of 500 m that exhibit dissimilar mean birefringence (0.04 ps/km, 1 ps/km, 0.04 ps/km). The signature will be very similar to the signature produced by a link made of sections that exhibit a long coupling length h, as shown in FIG. 3A, which illustrates the DOP signature of a link of 1.5 km that exhibits a large value of h (h close to 500 m). This ambiguity makes reliable interpretation of the DOP signature difficult when a link is made of a concatenation of relatively short fibers sections (for example, 2 km or less).

SUMMARY OF THE INVENTION

The present invention seeks to overcome, or at least mitigate, the limitations of the above-described prior art and/or provide an alternative.

According to one aspect of the present invention, a method of measuring characteristics of an optical path comprises the steps of:

transmitting a first series of polarized optical signal pulses into the path, each of the pulses having a length that is long compared with a beat length of the optical path and having a first state of polarization (SOP);

transmitting at least a second series of pulses into the path, the pulses of said second series each having a length comparable to that of the pulses of the first series but having a second state of polarization that differs significantly from the state of polarization of the pulses of said first series of pulses when the first and second states of polarization are represented on the Poincare sphere;

measuring, and averaging over a prescribed period of time, intensity of backscattered light corresponding to each of the first and second series of pulses;

deriving, from said intensity measurements, a DOP signature comprising a degree of polarization with respect to distance along the path for each of the first and second states of polarization; and analyzing said DOP signatures to determine variations in polarization mode dispersion (PMD) along the length of the path.

The step of deriving the degree of polarization may comprise the steps of sampling the intensity readings for each of the states of polarization at a multiplicity of distances along the path, using the samples to compute Stokes parameters for each distance and using the Stokes parameters to compute the DOP at each of the sample distances thereby, deriving a DOP signature trace for each of the first and second states of polarization.

The step of analyzing the statistics may involve determination of differences between the DOPs, or ratios between the DOPS, or autocorrelation therebetween, frequency analysis, and so on.

Preferably the SOPs are orthogonal on the Poincaré sphere For example, if the first SOP is linear, the second SOP may be linear and have an orientation of 45 degrees relative to the first SOP.

Thus, the invention is predicated upon quantifying the relationship between the statistics of the backscattered DOP and the coupling length h.

One preferred approach is to use the width of the autocorrelation function of the DOP, $h_{DOP}$, to quantify h since such function $h_{DOP}$ is directly proportional to h.

Preferably, the step of analyzing the statistics measures successive backscattered degree of polarization (DOP) traces taken for different P-OTDR source states of polarization (SOP) that are well apart on the Poincaré Sphere. This yields a significant improvement in the reliability for the detection of long coupling length h.

Preferably, measurements also are taken using a third input SOP, though a simplification using only two input SOPs is also possible.

Preferably, all input SOPs are mutually-orthogonal SOPs when represented on the Poincaré shape. For example the SOPs could be linear horizontal (0 degrees), linear diagonal (45 degrees) and circular According to a second aspect of the invention, apparatus for measuring optical characteristics of an optical path, such as an optical fiber, comprises:

means for transmitting a first series of polarized optical signal pulses into the path, each of the pulses having a length that is long compared with a beat length of the optical path and having a first state of polarization (SOP);

means for transmitting at least a second series of pulses into the path, the pulses of said second series each having a length comparable to that of the pulses of the first series but having a second state of polarization that differs significantly from the state of polarization of the pulses of said first series of pulses when the first and second states of polarization are represented on the Poincaré sphere;

means for measuring, and averaging over a prescribed period of time, intensity of backscattered light corresponding to each of the first and second series of pulses;

means for deriving, from said intensity measurements, a DOP signature comprising a degree of polarization with respect to distance along the path for each of the first and second states of polarization; and means for analyzing said DOP signatures to determine variations in polarization mode dispersion (PMD) along the length of the path.

In embodiments of either aspect of the invention, statistical analysis of the degree of polarization (DOP) of the backscattered signal advantageously may be used to detect sections of an optical transmission path for which mode-coupling behaviour (long h) leads to high PMD.

Various objects, features, aspects and advantages of the present invention will become more apparent from the following detailed description, taken in conjunction with the accompanying drawings, of a preferred embodiment of the invention, which is described by way of example only.

BRIEF DESCRIPTION OF DRAWINGS

FIG. 1A illustrates calculated backscattered SOP of an optical path for a large angle between the SOP and the birefringence axis BIR;

FIG. 1B illustrates calculated backscattered SOP for a small angle between the SOP and the birefringence axis BIR;

FIG. 2 illustrates measured DOP for an optical fiber that exhibits large values of coupling length h within its central section (distance from 500 m to 1000 m);

FIGS. 3A and 3B illustrate DOP signatures for fibers which exhibit, respectively, long coupling length and dissimilar birefringence;

FIG. 4 is a simplified block schematic diagram of apparatus for performing P-OTDR measurements on an optical path in accordance with the present invention;

FIGS. 5A, 5B and 5C illustrate degree of polarization (DOP) signatures obtained from measurements taken using, respectively, three orthogonal source SOPs for an optical fiber that exhibits large values of coupling length h;

FIG. 5D illustrates a composite DOP signature obtained by combining the DOP signatures shown in FIGS. 5A to 5C; and FIGS. 6A, 6B, 6C, and 6D correspond to FIGS. 5A to 5D but for an optical fiber that exhibits dissimilar birefringence.

DESCRIPTION OF A PREFERRED EMBODIMENT

Referring to FIG. 4, a P-OTDR comprises a pulsed optical source 10 for supplying pulses of polarized light and a polarization state adjustment (PSA) means 12 coupled to the source 10 for receiving the light pulses and adjusting their states of polarization successively to each of several different SOPs. A branching device 14, for example a circulator, a three-port coupler or a four-port coupler, couples the pulses from the output of the PSA means 12 to the fiber-under-test (FUT) 16. A polarization analyzer 18 coupled to branching device 14 receives the backscatter signal from the branching device 14, analyzes it and supplies it to a detector 20 which converts it to an electrical signal which it supplies to a measurement and control unit 22. The latter controls the optical source 10, PSA means 12 and analyzer means 18.

Preferably, source 10 is a narrow-linewidth source, such as a distributed feedback laser, to avoid spectral depolarization. Typically, the line width is less than 0.1 nm.

The PSA means 12 is used to generate the two or three orthogonal SOPs needed for the measurement. The functionality of such a polarization analyzer is known to persons skilled in this field, and described in optics textbooks, so only a general description will be given here.

In order to generate three SOPs, the PSA means 12 typically may comprise a rotatable polarizer 24 followed by a rotatable quarter-wave plate 26.

On the receiver side of the P-OTDR, the polarization analyzer 18 is used to analyze the SOP of the backscattered signal against distance. As shown in FIG. 1, typically, the analyzer 18 may comprise a quarter-wave plate 28 followed by a polarizer 30. Both the quarter-wave plate 28 and the polarizer 30 are rotatable. Other configurations of polarization analyzer are possible, however.

The evolution of the Stokes parameters S0, S1, S2 and S3 against distance must be measured in order to compute the DOP signature against distance. In use, therefore, at least four different P-OTDR traces, each a measurement of backscatter intensity against distance, with different orientations of the polarizer 30 and quarter-wave plate 28 (of analyzer 18) are taken in order to completely determine the state of polarization of the backscattered signal. These four measurements of intensity against time are sampled at each of a multiplicity of distances and the sets of four samples used to calculate Stokes parameters S1, S2 and S3 and S0 for each distance. Each corresponding set of Stokes parameters then are used to compute the degree of polarization (DOP) at the corresponding distance, thereby producing four DOP signatures, i.e., DOP versus distance, for that polarization state selected by the polarization adjustment means 12. In order to generate a second or third DOP signature (for the other source SOP), other sets each of four traces are taken.

Alternatively, the at least four traces can be measured simultaneously by splitting the signal received from branching device 14 into at least four different optical paths, each incorporating proper elements (polarizer 28 and/or quarter-wave plate 30) before detectors and acquisition electronics.

For a given position along the fiber-under-test 16, when the P-OTDR resolution is much larger than beat length of the backscattered signal ($L_p \gg L_b$) and the P-OTDR resolution is smaller than the mode coupling length ($L_p \ll h$), the orientation of the birefringence axis does not change within the P-OTDR resolution and the SOP of the backscattered signal rotates rapidly around the birefringence axis. Since the P-OTDR resolution is not sufficient to follow the rapid fluctuations of the real backscattered SOP, the measured SOP will 'collapse' toward the center of the circle made by the real SOP and the measured DOP will tend toward the absolute value of the cosine of the angle between the real SOP and the birefringence axis, as described hereinbefore with reference to FIGS. 1A and 1B. As long as the orientation of the birefringence axis of the fiber does not change against distance (relative to an initial position in the fiber), the measured DOP value will not change. If the orientation of the birefringence axis moves, the DOP value will vary.

When the DOP measurements are taken for three orthogonal P-OTDR source SOPs, they are not completely independent. Thus, FIGS. 6A to 6C show that, when an optical fiber link comprising sections having dissimilar birefringence is being investigated, the three DOP signatures will exhibit generally similar variations. On the other hand, as shown in FIGS. 5A to 5C, when the coupling length h is long, the three DOP signatures will be generally dissimilar (not all DOP traces are high or low at the same time). This behaviour advantageously facilitates discrimination between the occurrence of long coupling length and the presence of rapidly varying birefringence sections in a link.

It has been found that, when $L_p >> L_b$ but $L_p << h$, (i.e., long coupling length h), the geometric mean of the DOP signatures tends towards one:

$$\sqrt{DOP1^2 + DOP2^2 + DOP3^2} = 1$$

as can be seen from FIG. 5D.

(It should be noted that the term "geometric mean" is used herein to mean the square root of the sum of the squares.)

When $L_p << L_b$ (low birefringence), however, the geometric mean tends toward $$\sqrt{3},$$

as can be seen from FIG. 6D, specifically the portions for the sections between 0 and 500 m and 1000 m and 1500 m (the middle section not having low birefringence). This feature allows easy identification of sections that exhibit low birefringence and that cannot generate large PMD value, The DOP measurements could be taken for two orthogonal P-OTDR source SOPs. When investigating a link with sections having dissimilar birefringence, the two DOP signatures will exhibit similar variations. On the other hand, when h is long, the DOP signatures will be opposite (not all DOP traces are high or low at the same time). As explained above, this behaviour allows easy identification of sections that exhibit low birefringence and that cannot generate large PMD values.

All of the other sections present either a medium or a large birefringence and could potentially generate medium or high PMD depending upon the coupling length h. The statistics of the backscattered DOP of a fiber section (mean value, standard deviation, autocorrelation length, etc.) contain information that is related to the mode coupling length h.

The statistical analysis on the DOP can be done in different ways: for example, the analysis could look at the rate of change, the frequency content, the width of the autocorrelation function; or at the difference between the DOPs, the ratios between the DOPs, and so on.

Each of these methods will give relevant information that will allow a user to detect the occurrence of long coupling length h. An example of a possible analysis is to perform the calculation of the width of the autocorrelation function on one of the DOP measurements (the width, called $h_{DOP}$, is being defined as the distance needed for the autocorrelation function to drop to $1/e^2$ of its maximum value). The higher the value of h in the fiber, the higher will be $h_{DOP}$. Ideally this measurement would be performed on the three DOP measurements and would be averaged.

When the measurement is taken for two P-OTDR source SOPs, the two measurement of $h_{DOP}$ can be averaged.

Another possibility is to combine the two DOP signatures to generate a composite signal that can be further analyzed. The most obvious composite signal is the difference, ΔDOP, between the two DOP signatures, but other composite signals are possible (for example the arctangent of the ratio between the two DOP signatures).

Simple threshold rules can be applied to $h_{DOP}$ in order to classify fibers as having short coupling length h (50 m or less) or long coupling length h (more than 50 m). The optimum threshold value depends upon the spatial resolution of the P-OTDR. For example, with a P-OTDR acquisition taken with pulses of 100 ns total width, the threshold for detection of long coupling length h typically would be set around 75 m in order to detect fibers with coupling length h>100 m. The classification rules may be very simple and use only one threshold level, or more complex and use multiple threshold levels to classify between short, medium, long, super-long etc. values of h.

This classification can be used to identify the risk of high PMD. When $h_{DOP}$ is above threshold, h is long and there is a high risk of high PMD. Conversely, when $h_{DOP}$ is below threshold, the risk of high PMD is low. The value of PMD cannot be known precisely since only the value of h is measured; the birefringence is still unknown. However, the occurrence of a large value of h has been shown to occur in most of those fibers that exhibit very high-PMD values. Consequently, detection of the occurrence of long h should be sufficient to detect most of the high-PMD sections of a link.

Various modifications to the above-described embodiment may be made without departing from the scope of the present invention. For example, if only two source SOPs are required, the polarizer 24 can be fixed. Moreover, if the laser source 10 is pigtailed with a polarization maintaining fiber (PMF), the polarizer 24 can be omitted as the SOP at the input of the quarter-wave plate 26 will already be linear (assuming a good polarization extinction ratio in the PMF fiber).

In the latter case, calibration of the orientation of the quarter-wave plate 26 relative to the PMF axis may be appropriate. For example, if a linear SOP and a circular SOP are to be generated, the quarter-wave plate 26 must be aligned with the axis of the PMF and disposed at 45 degrees relative to the axis of the PMF, respectively.

This particular calibration is not absolutely essential. Any two positions of the quarter-wave plate 26 that are separated by 45 degrees will generate two orthogonal states on the Poincare sphere (but not necessarily linear and circular). Indeed, the SOPs need not be orthogonal, though it is envisaged that they must be widely spaced relative to each other.

Examples of the many alternatives for the components of the P-OTDR equipment shown in FIG. 1 are listed in the above-mentioned U.S. Pat. No. 6,229,599, which is incorporated herein by reference. Thus, the source means may be a semiconductor laser diode, a solid state laser, or a gas laser, with a wavelength bandwidth preferably less than 0.1 nanometers and a peak power preferably greater than one milliwatt. The source means may include optical amplifiers, which may take the form of semiconductor or optical fiber amplifiers. The source means may also include means for defining a specific state of polarization of the light emitted. The light emitted by the source means may be any electromagnetic radiation at wavelengths appropriate for the measurements being made and the optical fiber under test. Preferably, the wavelength of the source means is in the range of approximately 1100 nanometers to 1800 nanometers. The polarization-independent branching means may include one or more bulk-optic components, such as non-polarizing beam-splitters, or may include one or more optical fiber components, such as directional fiber couplers or optical fiber circulators. In addition, the polarization-independent coupler means may include an active element such as an acousto-optic deflector.

The polarization adjustment means may comprise one or more bulk-optic birefringent waveplates, such as half-wave and quarter-wave plates, and linear or circular polarizers, that may be rotated about an optical axis in an optical path, and/or inserted and removed from the optical path, to select a specific state of polarization of the light output from the polarization controller means. The polarization adjustment means may also comprise contiguous sections of the birefringent optical fiber that may be positioned relative to each other to alter the state of polarization of the light output. The polarization adjustment means may also include one or more planar integrated optics circuits in which the state of polarization of the light output may be selected by electrical signals supplied by the launch controller means.

The polarization analyzer means may comprise one of more bulk-optic birefringent waveplates, such as half-wave and quarter-wave plates, and linear or circular polarizers, that may be rotated about an optical axis in an optical path, and/or inserted and removed from the optical path, to select a specific state of polarization of the light input from the polarization independent coupler means. The polarization analyzer means may also include one or more planar integrated optics circuits in which the state of polarization of the light output is selected by electrical signals supplied by the receiver controller means.

The measurement and controller means may comprise a personal computers, microprocessor, dedicated electronic processor, analogue to digital convertors, digital to analogue convertors, electric motors, and/or other electronic and electromechanical components, as are well-known to someone skilled in the art of measurement instrumentation. The processor means may include processing algorithms which may be related to the physical theory of measurement, such as for polarization mode dispersion. The processor means may also include algorithms which may be appropriate only for a specific optical fiber and specific conditions, where the measurement problem may not be fully tractable to known theoretical analysis, but, nevertheless, measurement obtained by the current invention may be correlated with the optical fiber to provide useful information about the behaviour of the specific optical fiber.

In contrast to prior art techniques, such as that disclosed in U.S. Pat. No. 6,229,599, which use very short pulses so as to discriminate the oscillations of the backscatter trace, embodiments of the present invention operate with relatively long pulses ($L_p >> L_b$), so that the spatial resolution of the P-OTDR is not sufficient to discriminate the backscatter oscillations due to birefringence of the fiber (except for very low birefringence). Embodiments of the invention do not need to discriminate the oscillations due to the birefringence of the fiber and so can use longer pulses and measure a longer distance within the fiber before the signal falls into the noise floor (better measurement range).

A further advantage of embodiments of the present invention is that, because they use statistics of DOP vs. distance (rather than wavelength) they do not require a wavelength tunable source.

Although an embodiment of the invention has been described and illustrated in detail, it is to be clearly understood that the same is by way of illustration and example only and not to be taken by way of limitation, the spirit and scope of the present invention being limited only by the appended claims.

References

[1] A. J. Rogers, "Polarization-optical time domain reflectometry: A technique for the measurement of field distributions", *Appl. Opt.*, vol. 20, pp.1060–1074, 1981

[2] F. Corsi, A. Galtarossa, L. Palmieri, "Beat length characterization based on backscattering analysis in randomly perturbed single-mode fibers", *J. Lightwave Tech.*, vol. 17, no. 7, pp. 1172–1178, 1999

[3] H. Sunnerud, B.-E. Olsson, P. A. Andrekson, "Measurement of polarization mode dispersion accumulation along installed optical fibers", *IEEE Photonic Tech. Letters*, vol. 11, no. 7, pp. 860–862, 1999

[4] M. Wuilpart, A. J. Rogers, P. Megret, M. Blondel, "Fully-distributed polarization properties of an optical fibre using the backscattering technique", *Applications of Photonic Tech.* (*Photonics North* 2000), SPIE 4087, pp. 396–404, 2000

[5] B. Huttner, B. Gisin, N. Gisin, "Distributed PMD measurement with a polarization-OTDR in Optical fibers", *J. Lightwave Tech.*, vol. 17, no. 10, pp. 1843–1848, 1999.

[6] M. Leblanc, "Distributed detection of high-PMD sections on installed fibers using a polarization-OTDR", OFMC '01, pp. 155–62.

What is claimed is:

1. A method of measuring characteristics of an optical path comprising the steps of: transmitting a first series of polarized optical signal pulses into the path, each of the pulses having a length that is long compared with a beat length of the optical path and having a first state of polarization (SOP);

transmitting at least a second series of pulses into the path, the pulses of said second series each having a length substantially equal to the length of the pulses of the first series but having a second state of polarization that differs significantly from the state of polarization of the pulses of said first series of pulses when the first and second states of polarization are represented on the Poincaré sphere;

measuring, and averaging over a prescribed period of time, intensity of backscattered light corresponding to each of the first and second series of pulses;

deriving, from said intensity measurements, a degree of polarization (DOP) signature comprising a degree of polarization with respect to distance along the path for each of the first and second states of polarization; and analyzing said DOP signatures to determine variations in polarization mode dispersion (PMD) along the length of the path.

2. A method according to claim 1, further comprising the step of transmitting a third series of pulses into the path, the pulses of the third series each having a pulse length substantially equal to the length of the pulses of the first series and a third state of polarization that differs significantly from the first and second states of polarization.

3. A method according to claim 2, wherein the step of deriving the degree of polarization signatures comprises the steps of sampling the intensity readings for each of the states of polarization at a multiplicity of distances along the path, using the samples at each distance to compute a set of Stokes parameters for that distance and using the set of Stokes parameters to compute the DOP at that distance thereby to derive a DOP signature for each of the states of polarization of the series of pulses transmitted into the path.

4. A method according to claim 3, wherein the states of polarization of the different series of pulses are substantially mutually-orthogonal when represented on a Poincaré sphere.

5. A method according to claim 2, wherein the first, second and third states of polarization are mutually orthogonal when represented on the Poincaré sphere and the three corresponding DOP signatures are combined to form a composite DOP signature, said step of analyzing the DOP signatures then analyzing the composite DOP signature.

6. A method according to claim 5, wherein the composite DOP signature is a geometric DOP signature obtained as the square root of the sum of the squares of the three DOP signatures($DOP1^2+DOP2^2+DOP3^2$).

7. A method according to claim 6, wherein low birefringence portions of the optical fiber are identified by a local value of said geometric DOP signature close to $$\sqrt{3}.$$

8. A method according to claim 6, wherein portions of the optical fiber that exhibit a long coupling length are identified by a local value of said geometric DOP signature close to 1.

9. A method according to claim 1, wherein the step of deriving the degree of polarization signatures comprises the steps of sampling the intensity readings for each of the states of polarization at a multiplicity of distances along the path, using the samples at each distance to compute a set of Stokes parameters for that distance and using the set of Stokes parameters to compute the DOP at that distance thereby to derive a DOP signature for each of the states of polarization of the series of pulses transmitted into the path.

10. A method according to claim 9, wherein the slates of polarization of the different series of pulses are substantially mutually-orthogonal when represented on a Poincaré sphere.

11. A method according to claim 1, wherein the states of polarization of the different series of pulses are substantially mutually-orthogonal when represented on a Poincaré sphere.

12. A method according to claim 1, wherein the step of analyzing the DOP signatures uses one or more of autocorrelation, frequency content analysis, rate of change analysis or other statistical analysis.

13. A method according to claim 1, wherein the first and second states of polarization are orthogonal when represented on the Poincaré sphere and the corresponding DOP signatures are combined to form a composite DOP signature, said step of analyzing the DOP signatures then analyzing the composite DOP signature.

14. A method according to claim 13, wherein the composite DOP signature is derived as the difference between the two DOP signatures, or the ratio between the DOP signatures, or any other combination.

15. A method according to claim 14, wherein the analysis of the composite DOP signature uses autocorrelation, frequency content, rate of change or other statistical analysis.

16. A method according to claim 13, wherein the analysis of the composite DOP signature uses autocorrelation, frequency content, rate of change or other statistical analysis.

17. Apparatus for measuring optical characteristics of an optical path, such as an optical fiber, comprises: means for transmitting a first series of polarized optical signal pulses into the path, each of the pulses having a length that is long compared with a beat length of the optical path and having a first state of polarization (SOP);

means for transmitting at least a second series of pulses into the path, the pulses of said second series each having a length substantially equal to the length of the pulses of the first series but having a second state of polarization that differs significantly from the state of polarization of the pulses of said first series of pulses when the first and second states of polarization are represented on the Poincaré sphere;

means for measuring, and averaging over a prescribed period of time, intensity of backscattered light corresponding to each of the first and second series of pulses;

means for deriving, from said intensity measurements, a DOP signature comprising a degree of polarization with respect to distance along the path for each of the first and second states of polarization; and means for analyzing said DOP signatures to determine variations in polarization mode dispersion (PMD) along the length of the path.

18. Apparatus according to claim 17, further comprising means for transmitting a third series of pulses into the path, the pulses of the third series each having a pulse length substantially equal to the length of the pulses of the first series and a third state of polarization that differs significantly from the first and second states of polarization and wherein the measuring means, deriving means and analyzing means operate upon corresponding backscattered light corresponding to the third series of pulses.

* * * * *